United States Patent [19]

Chou

[11] Patent Number: 5,283,957

[45] Date of Patent: Feb. 8, 1994

[54] INCLINOMETER FOR WHEELED CYCLES

[76] Inventor: Ming-Fu Chou, No. 27, Alley 2, Lane 437, Peitun Rd., Taichung, Taiwan

[21] Appl. No.: 22,186

[22] Filed: Feb. 25, 1993

[51] Int. Cl.$^5$ .............................................. G01C 9/12
[52] U.S. Cl. .................................... 33/391; 33/365
[58] Field of Search .................. 33/391, 397, 398, 365

[56] References Cited

U.S. PATENT DOCUMENTS

| 3,591,125 | 7/1971 | Dupin | 33/391 X |
| 4,415,152 | 11/1983 | Smith | 434/61 X |
| 4,747,217 | 5/1988 | Austin | 33/391 |

FOREIGN PATENT DOCUMENTS

| 440186 | 1/1927 | Fed. Rep. of Germany | 33/391 |
| 1930239 | 12/1970 | Fed. Rep. of Germany | 33/391 |
| 2177202 | 1/1987 | United Kingdom | 33/365 |

Primary Examiner—William A. Cuchlinski, Jr.
Assistant Examiner—Alvin Wirthlin
Attorney, Agent, or Firm—Poms, Smith, Lande & Rose

[57] ABSTRACT

An inclinometer is disposed on a wheeled cycle for indicating the inclination of the wheeled cycle and includes a housing, a panel fixed on the housing, a slot longitudinally formed in the panel, a graduation printed beside the slot, a shaft rotatably supported in the housing, a tube rotatably engaged on the shaft, a weight secured to a bottom portion of the tube, and a pointer extended upward from the tube and movable along the slot of the panel. The pointer moves relative to the graduation when the housing rotates relative to the shaft in order to indicate the inclination of the wheeled cycle.

2 Claims, 3 Drawing Sheets

FIG. 2
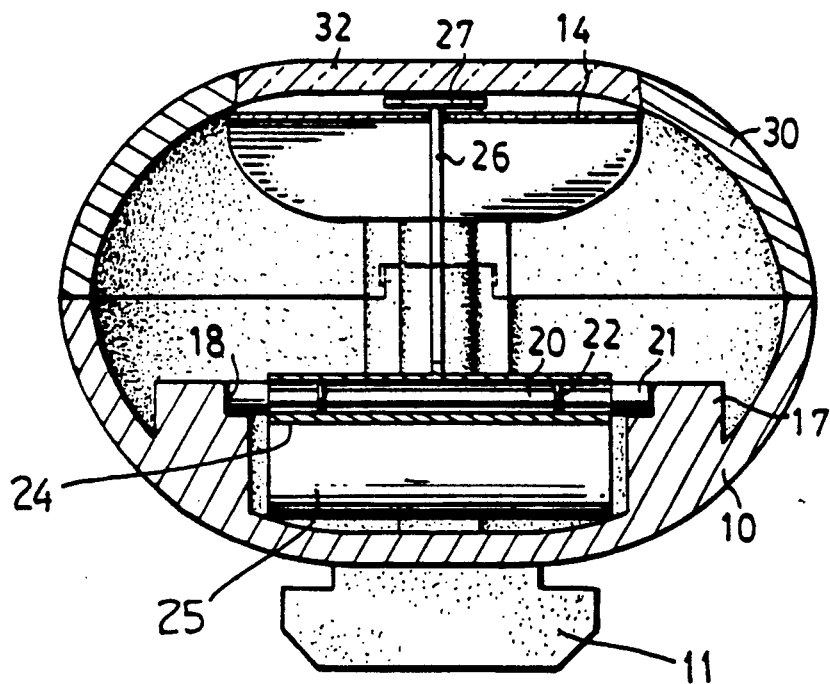
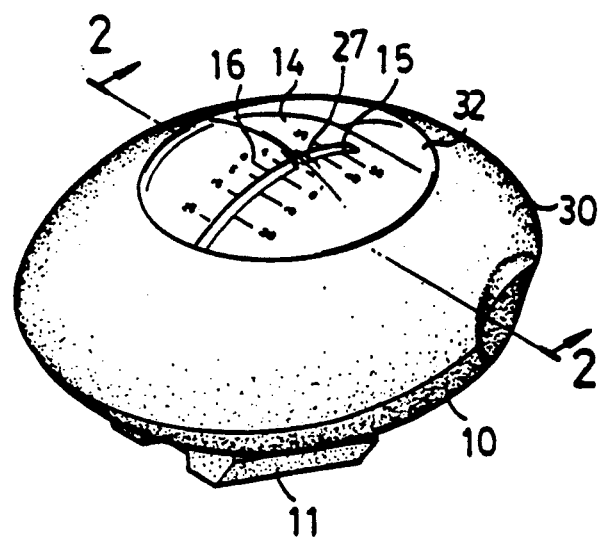
FIG. 1

INCLINOMETER FOR WHEELED CYCLES

BACKGROUND OF THE INVENTION

1. Field of the Invention

The present invention relates to an inclinometer, and more particularly to an inclinometer for wheeled cycles.

2. Description of the Prior Art

As far as applicant is aware, no inclinometers were developed for bicycles or motorcycles in order to indicate the inclination of the wheeled cycles.

The present invention has arisen to provide a novel inclinometer for wheeled cycles.

SUMMARY OF THE INVENTION

The primary objective of the present invention is to provide an inclinometer for indicating the inclination of the wheeled cycles.

In accordance with one aspect of the invention, there is provided an inclinometer for a wheeled cycle comprising a housing fixed on the wheeled cycle, a panel fixed on the housing and including a slot longitudinally formed therein and a graduation provided beside the slot, a shaft rotatably supported in the housing and substantially perpendicular to the slot of the panel, a tube rotatably engaged on the shaft, a weight secured to a bottom portion of the tube, a pointer extended upward from the tube and movable along the slot of the panel, and the pointer moving along the slot and moving relative to the graduation when the wheeled cycle and the housing 10 relatively rotate about the shaft, whereby, the inclination of the wheeled cycle is indicated by the pointer.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 1 is a perspective view of an inclinometer in accordance with the present invention;

FIG. 2 is a cross sectional view taken along lines 2—2 of FIG. 1; and

DETAILED DESCRIPTION OF THE PREFERRED EMBODIMENT

Figure 3:
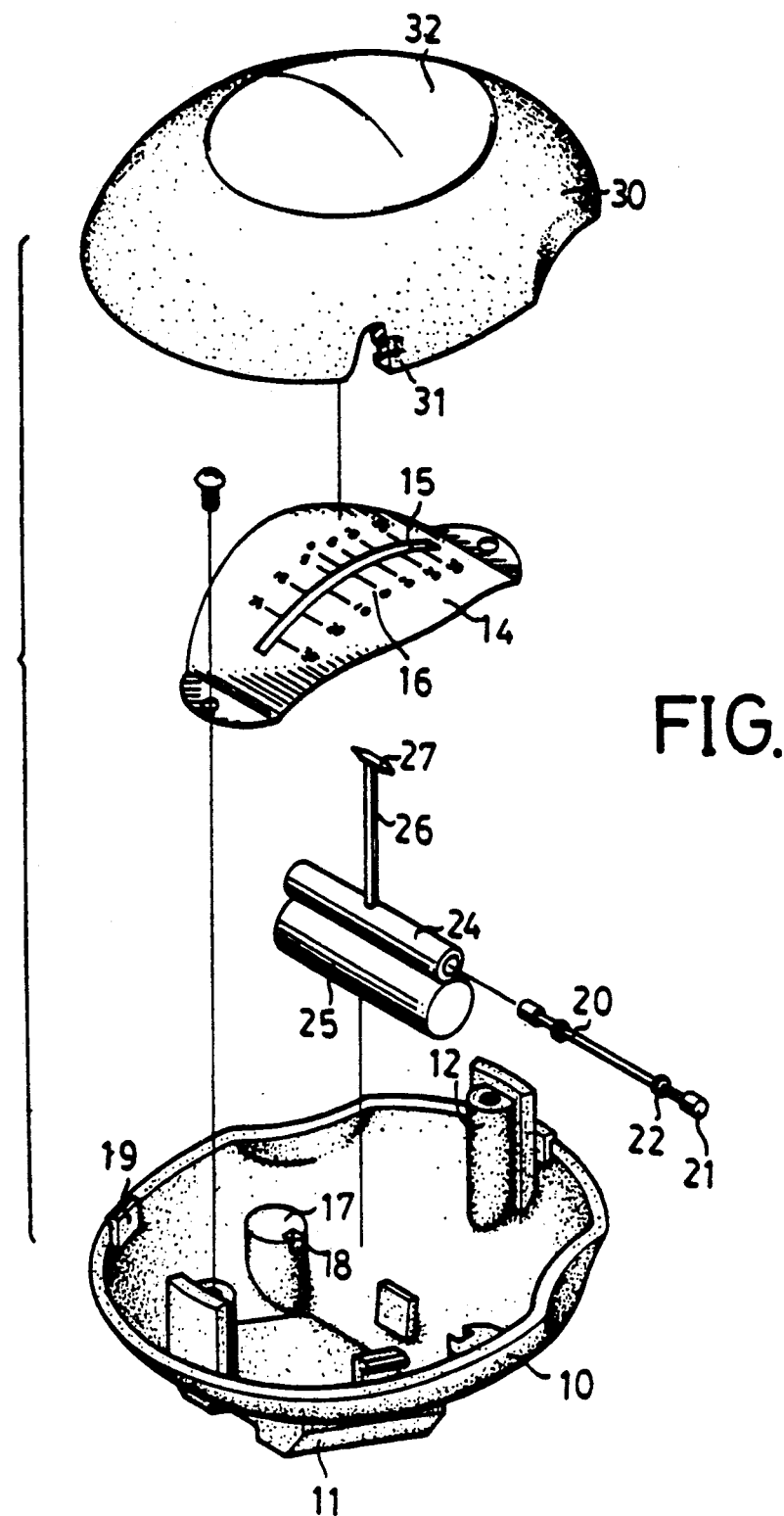
FIG. 3 is an exploded view of the inclinometer.

Referring to the drawings, an inclinometer in accordance with the present invention is provided to indicate the inclination of the wheeled cycles and comprises a housing 10 having a bracket 11 provided on the bottom thereof for attachment to the wheeled cycles, particularly the handlebar of the wheeled cycles, a pair of hubs 12 oppositely provided in the housing 10, a panel 14 fixed on the hubs 12 by screws and including a slot 15 longitudinally formed therein and a graduation 16 provided beside the slot 15, a pair of stubs 17 oppositely provided in the housing 10 and each having a depression 18 formed therein, and at least three spaced hooks 19 provided in the housing 10 and extended upward beyond the housing 10.

A shaft 20 includes two ends each having head 21 formed thereon for engagement in the depressions 18 of the stubs 17 respectively and arranged such that the shaft 20 is substantially perpendicular to the slot 15 of the panel 14, and two discs 22 disposed on the shaft 20. A tube 24 is engaged on the shaft 20 and freely rotatable about the shaft 20, a weight 25 is secured to the bottom of the tube 24, a column 26 is extended upward from the tube 24 and extended upward through the slot 15 of the panel 14, and a pointer 27 is provided on top of the column 26. It is to be noted that, due to the gravity, the weight 25 is kept in the bottom portion of the tube 24 whenever the housing 10 rotates relative to the shaft 20. It is preferable that the discs 22 and the heads 21 have an identical outer diameter such that the tube 24 can be easily engaged onto the shaft 20, best shown in FIG. 2. A cap 30 includes at least three notches 31 formed therein for engagement with the hooks 19 of the housing 10 such that the cap 30 can be secured to the housing 10, and includes a lens 32 provided in the middle portion, the lens 32 is transparent such that the relative movement between the pointer 27 and the panel 14 can be seen.

Figure 4:
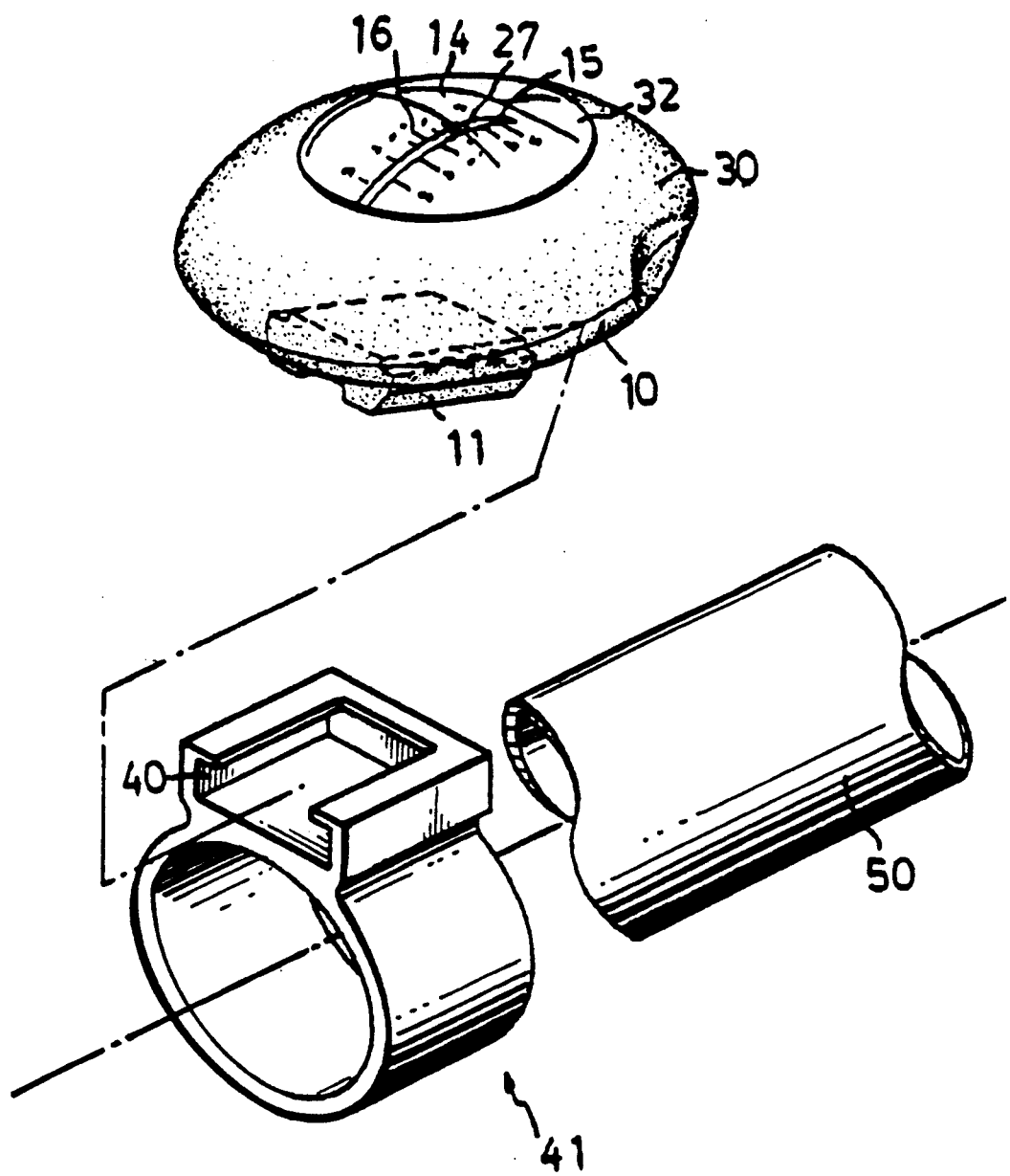

Referring to FIG. 4, the inclinometer is attached to the bicycle handlebar 50 by a socket 41 which is mounted on the handlebar 50 and has a receiving seat 40 on an upper side thereof to receive the bracket 11 of the inclinometer.

In operation, when the inclinometer is disposed on a wheeled cycle and when the wheeled cycle moves up and down, the column 26 moves along the slot 15 of the panel 14 and the pointer 27 moves relative to the graduation 16 such that the inclination of the housing 10 or of the wheeled cycle can be obtained by the graduation indicated by the pointer 27.

Accordingly, the inclination of the wheeled cycle can be indicated by the inclinometer in accordance with the present invention.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An inclinometer for a wheeled cycle comprising a housing for fixing on said wheeled cycle and having a pair of stubs formed therein, a panel fixed on said housing and including a slot longitudinally formed therein and a graduation provided beside said slot, a shaft extending in a direction substantially perpendicular to said slot of said panel, said shaft including two ends each of which having a head rotatably engaged in said depressions of said stubs respectively, said shaft including at least two discs provided thereon, each of said discs having an outer diameter identical to that of said heads, a tube rotatably engaged on said shaft, a weight secured to a bottom portion of said tube, a pointer extending upward from said tube and movable along said slot of said panel, said pointer moving along said slot and moving relative to said graduation when said wheeled cycle and said housing relatively rotate about said shaft, whereby, the inclination of said wheeled cycle is indicated by said pointer.

2. An inclinometer according to claim 1, wherein said housing includes at least three spaced hook provided therein and extended upward beyond said housing, said inclinometer further comprising a cap including at least three notches formed thereon for engagement with said hooks so as to secure said cap to said housing, said cap including a lens provided in a center portion thereof.

* * * * *